US010371897B2

(12) United States Patent
Yue

(10) Patent No.: US 10,371,897 B2
(45) Date of Patent: Aug. 6, 2019

(54) METHOD AND APPARATUS FOR PROVIDING MULTIPORT FREE-SPACE WDM DEVICE USING FOLDED OPTICAL-PATH

(71) Applicant: OPTIWORKS, INC., Fremont, CA (US)

(72) Inventor: Xuefeng Yue, San Jose, CA (US)

(73) Assignee: OW Holding Inc., Grand Cayman (KY)

(*) Notice: Subject to any disclaimer, the term of this patent is extended or adjusted under 35 U.S.C. 154(b) by 0 days.

(21) Appl. No.: 15/608,942

(22) Filed: May 30, 2017

(65) Prior Publication Data

US 2017/0261691 A1 Sep. 14, 2017

Related U.S. Application Data

(63) Continuation-in-part of application No. 14/852,540, filed on Sep. 12, 2015, now abandoned.

(60) Provisional application No. 62/098,989, filed on Dec. 31, 2014.

(51) Int. Cl.
*H04J 14/02* (2006.01)
*G02B 6/32* (2006.01)
*G06K 9/00* (2006.01)
*G02B 6/293* (2006.01)

(52) U.S. Cl.
CPC ....... *G02B 6/29368* (2013.01); *G02B 6/2938* (2013.01); *G02B 6/29379* (2013.01); *G02B 6/327* (2013.01); *G06K 9/00046* (2013.01); *H04J 14/02* (2013.01)

(58) Field of Classification Search
None
See application file for complete search history.

(56) References Cited

U.S. PATENT DOCUMENTS

| 2002/0064191 A1* | 5/2002 | Capewell ........... G02B 6/29367 372/14 |
| 2002/0181046 A1* | 12/2002 | Jeong ................. G02B 6/29362 398/79 |
| 2003/0002787 A1* | 1/2003 | Honda ............... G02B 6/29365 385/24 |
| 2010/0329678 A1 | 12/2010 | Wang et al. | |

* cited by examiner

*Primary Examiner* — Darren E Wolf
(74) *Attorney, Agent, or Firm* — Intellectual Property Law Group LLP

(57) ABSTRACT

An optical wavelength-division multiplexing ("WDM") device utilizing a mechanism of folded optical-path includes multiple collimators, optical filters, prism, and glass plate. The collimators are capable of collimating optical lights for facilitating free-space optical communication. The optical filters optically coupled with the collimators provide filtering functions to separate optical wavelengths in accordance with the configurations or characteristics of optical filters. The prism having an interface surface and two side surfaces is configured to direct or redirect optical beams based on the angle of incidence ("AOI") of each optical beam received. The glass plate, in one embodiment, physically configured to be situated in parallel with the collimators is capable of providing free-space optical paths for facilitating separation of wavelengths.

21 Claims, 9 Drawing Sheets

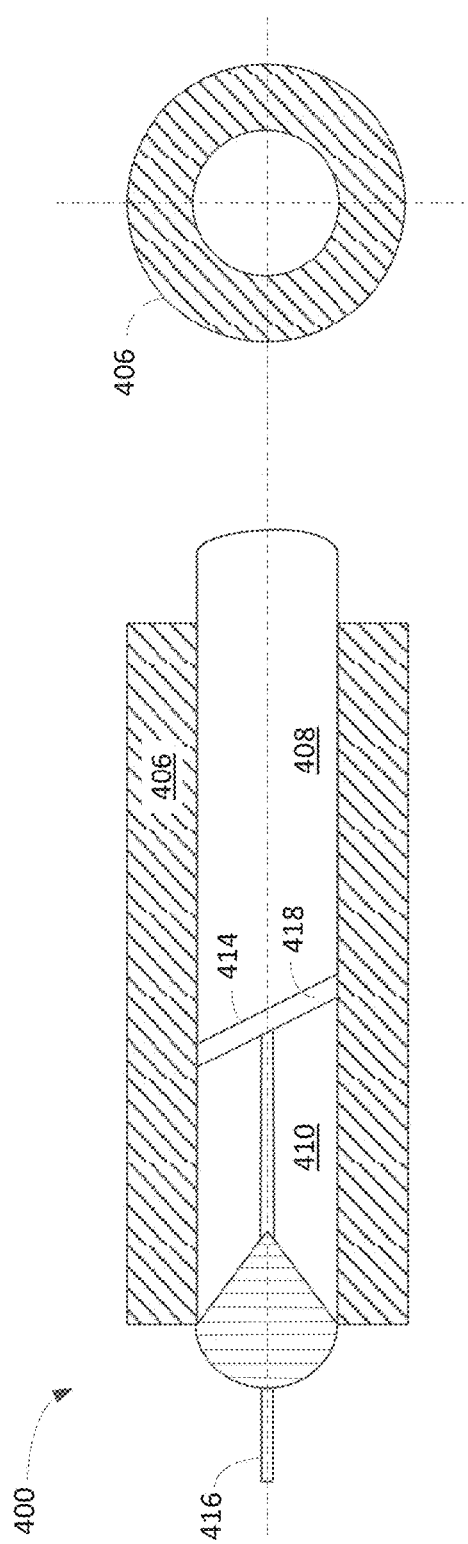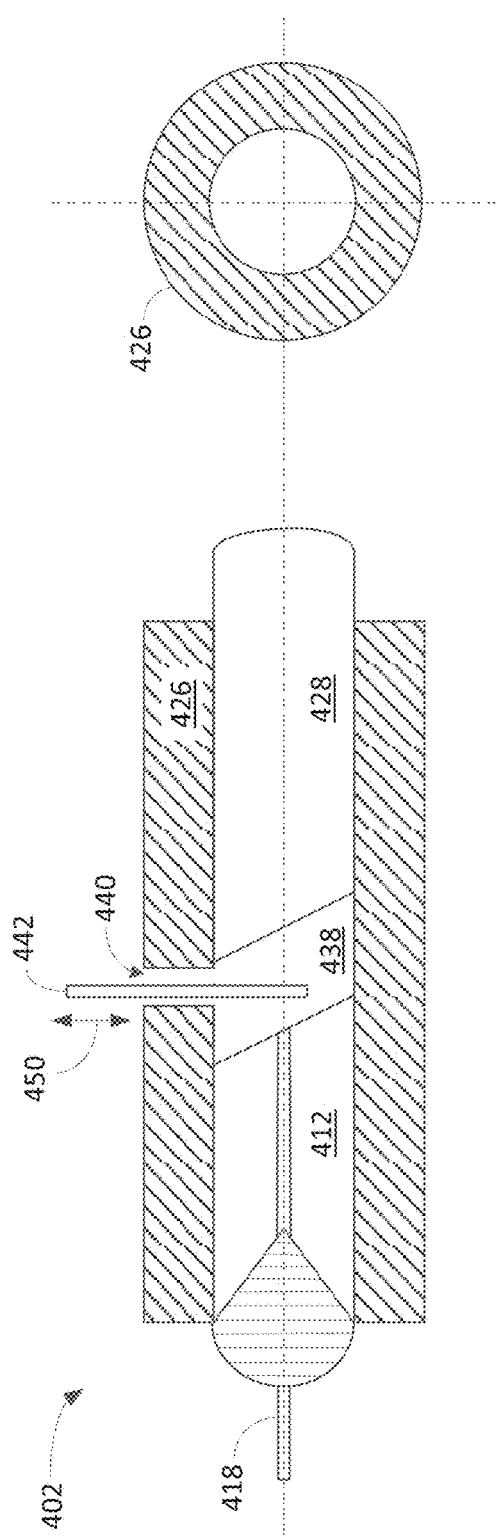

METHOD AND APPARATUS FOR PROVIDING MULTIPORT FREE-SPACE WDM DEVICE USING FOLDED OPTICAL-PATH

PRIORITY

This application is a continuation-in-part of and claims the benefit of priority to co-pending U.S. patent application having Ser. No. 14/852,540 filed on Sep. 12, 2015, in the name of the same inventor and entitled "Assembly of Standard DWDM Devices for Use on Free-Space Multiport DWDM Devices," which further claims the benefit of priority of provisional application No. 62/098,989, filed on Dec. 31, 2014, all mentioned U.S. applications are hereby incorporated herein by reference in their entirety.

FIELD

The exemplary embodiment(s) of the present invention relates to telecommunications network. More specifically, the exemplary embodiment(s) of the present invention relates to optical networking.

BACKGROUND

With increasing demand for more information to be supplied to homes and/or businesses, network providers are constantly adding, expanding, upgrading, and/or switching their networks to improve overall optical communications network(s). Optical communications networks typically offer high-speed voice, video, and data transmission between users, such as providers, residential homes, businesses, government agents, and/or networks. For example, conventional optical networks include, but not limited to, fiber to the node/neighborhood ("FTTN"), fiber to the curb ("FTTC"), fiber to the building ("FTTB"), fiber to the home ("FTTH"), fiber to the premises ("FTTP"), or other edge location to which a fiber network extends.

To increase data capacity with high transmission speed using optical fibers, the optical network deploys wave-divisional multiplexing ("WDM") optical transmission mechanism. WDM system may include coarse WDM ("CWDM"), dense WDM ("DWDM"), or the like. A feature of WDM system is to allow a single optical fiber to carry multiple channels or wavelengths of optical data.

To route optical signals between various optical nodes or devices, a WDM system, for example, may be employed to handle optical signal routing. The WDM system, for certain applications, is able to multiplex a number of optical signals with different wavelengths onto a single optical fiber. A wavelength may also be referred as a frequency or color capable of traveling across an optical fiber. Different wavelengths, for instance, can be generated by different lasers. With a WDM network environment, a typical fiber may be configured to carry multiple sets of network traffic using different wavelengths. For instance, a fiber can be configured up to 88 channels wherein each channel can transmit a specific type of wavelength containing optical information.

To properly multiplexing and demultiplexing each optical signal or wavelength from WDM transmission, combining and separating processes are required. Since designed incident angle is generally small such as 1.8° (degrees) for DWDM, separation of reflected beam can be difficult. To differentiate wavelengths with small angles, an optical path which is also known as working distance or gap, between the filters and the mirror can be relatively long. For example, for DWDM with channel spacing less than 200 GHz with smaller designed AOI (angle of incidence), such as 3.5° and 1.8°, the optical path (gap between mirror and filters) can be greater than 20 millimeters (>20 mm) in order to couple the separated beam into fibers or fiber collimators.

A problem associated with a compact optical device such as a WDM device is that it is difficult to reduce the overall size of the device due to various limitations such as minimal AOI and optical paths.

SUMMARY

One embodiment of the presently claimed invention discloses a multiport free-space wavelength division multiplexing ("WDM") device capable of deploying a mechanism of folded optical-path. The WDM device includes multiple collimators, optical filters, prism, and glass plate. The collimators, for example, are capable of collimating optical lights for facilitating free-space optical communication. The optical filters optically coupled with the collimators provide filtering functions to separate optical wavelengths in accordance with the configurations or characteristics of optical filters. The prism having an interface surface and two side surfaces is configured to direct or redirect optical beams based on the angle of incidence ("AOI") of each optical beam received. The glass plate, in one embodiment, physically configured to be situated in parallel with the collimators is capable of providing free-space optical paths for facilitating separation of wavelengths.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIGS. 4-5 are block diagrams illustrating exemplary collimators used with WDM device(s) in accordance with one embodiment of the present invention;

DETAILED DESCRIPTION

Figure 1:
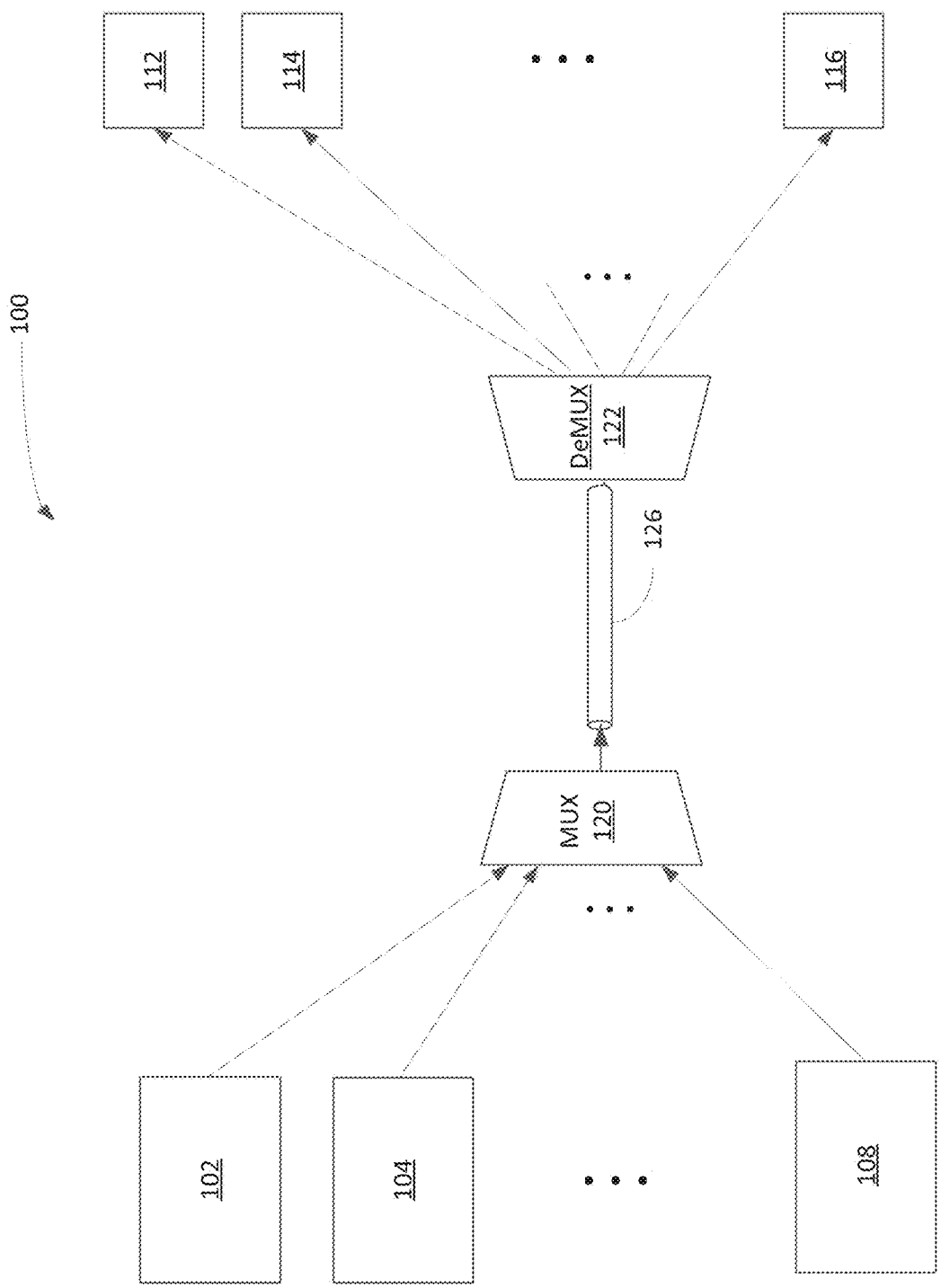
FIG. 1 is a block diagram illustrating an optical network using one or more WDM devices for transmitting optical data using a folded optical-path mechanism ("FOM") in accordance with one embodiment of the present invention.

Exemplary embodiment(s) of the present invention is described in context of a method and/or apparatus for WDM optical networking using a folded optical-path mechanism.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

Communication network means any type of network that is able to transmit data in a form of packets, cells, or frames. A communication network may be, for example, an IP communication network or an IP network carrying traffic packed in cells such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may include one or more of a satellite network, a DVB-RCS (Digital Video Broadcasting-Return Channel System) network, an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, the evolution of the UMTS known as LTE (Long Term Evolution), or DVB-H (Digital Video Broadcasting-Handhelds)), a hybrid (satellite and terrestrial) network, and/or an optical network.

In a WDM system, different colors of light, for example, are combined by a WDM multiplexing device and multiplexed onto a single fiber strand wherein each color of wavelength can be called a channel. On the receiving side, each color is separated into its own channel by using a WDM demultiplexing device. Thin film filters are used as optical filters to pass and/or reflect desired wavelengths. In one example, thin film filter based WDM's can be cascaded to obtain a higher-channel number, such as 4, 8, 16, and 32 channels.

One embodiment of the presently claimed invention discloses a multiport free-space WDM device capable of deploying a mechanism of folded optical-path or folded optical-path mechanism ("FOM"). In one aspect, a WDM device includes multiple collimators, optical filters, prism, and glass plate. The collimators, for example, are capable of collimating optical lights for facilitating free-space optical communication. The optical filters optically coupled with the collimators provide filtering functions to separate optical wavelengths in accordance with the configurations or characteristics of optical filters. The prism having an interface surface and two side surfaces is configured to direct or redirect optical beams based on the angle of incidence ("AOI") of each optical beam received. The glass plate, in one embodiment, physically configured to be situated in parallel with the collimators is capable of providing free-space optical paths for facilitating separation of wavelengths.

FIG. 1 is a block diagram 100 illustrating an optical network using one or more WDM devices for transmitting optical data using a folded optical-path mechanism ("FOM") in accordance with one embodiment of the present invention. The WDM optical network or system includes multiple transponders or optical devices 102-116, multiplexer ("mux") 120, de-multiplexer ("demux") 122, and fiber 126. The transponder, for example, is an optical device capable of sending and receiving optical data via a fiber. The optical devices include, but not limited to, optical line terminals ("OLTs") and/or optical network units ("ONUs"). It should be noted that the underlying concept of the exemplary embodiment(s) of the present invention would not change if one or more blocks (or devices) were added to or removed from diagram 100.

A WDM network is an optical communication network capable of multiplexing multiple optical carrier ("OC") signals onto one fiber such as fiber 126 for transporting information from one or more sources to one or more destinations. To multiplex multiple OC signals, different wavelengths (i.e., colors) are multiplexed onto a single stream of optical light. The WDM network logically connects multiple nodes that are separated by geographic distances (i.e., network nodes) for network communication.

In one embodiment, mux 120 is an optical device configured to multiplexing multiple optical signals or wavelengths ("λn") into one single light beam transmitted by a single fiber 126. Demux 122, on the other hand, is an optical device capable of separating or splitting optical signal(s) or wavelength λ from the light beam which contains multiple optical signals or λn. To properly extract designated wavelength(s) from a light beam, demux 122, in one aspect, includes one or more passive WDM blocks capable of performing FOM to separate optical signals represented by different λ from the light beam. It should be noted that passive WDM block does not require a power supply to repower or refresh optical signals or light beam. To simplify forgoing discussion, the operation(s) and device(s) relating the demux are described as exemplary illustrations of the presently claimed invention. The description of demux device should be equally applicable to mux devices.

An advantage of using a passive WDM block with FOM is that it reduces space allowing compact manufacturing and/or fabrication.

Figure 2A:
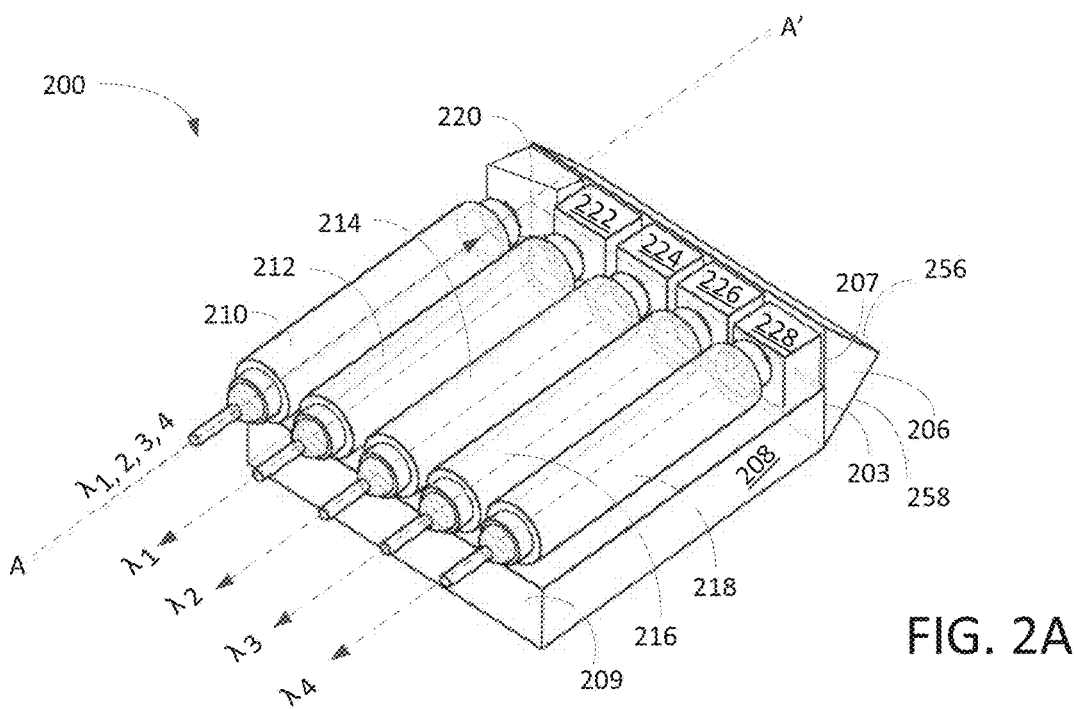
FIGS. 2A-B are block diagrams illustrating a WDM device or WDM block capable of separating multiple optical signals using FOM in accordance with one embodiment of the present invention.

FIG. 2A is a three (3) dimensional ("3D") diagram 200 illustrating a WDM device or WDM block capable of separating multiple optical signals using FOM in accordance with one embodiment of the present invention. Diagram 200 illustrates five (5) collimators 210-218, glass block 220, optical filters 222-228, prism 206, and glass plate 208. In one aspect, block 220 is also referred to as an input prism. A benefit of the WDM device illustrated in diagram 200 is to align collimators 210-218 and glass plate 208 in parallel for facilitating FOM whereby the overall physical structure of WDM device can be reduced. It should be noted that the underlying concept of the exemplary embodiment(s) of the present invention would not change if one or more blocks (or devices) were added to or removed from diagram 200.

In one aspect, collimators 210-218 can be divided into input collimator 210, and four (4) output collimators 212-218. A function of a collimator is to collimate optical lights so that the collimated optical lights can travel through free-space optical channels with minimal photon loss. Optical filters 222-228 which are optically coupled with the collimators are able to filter optical wavelengths in accordance with configurations or characterizes of optical filters used. Prism 206, in one embodiment, includes an interface surface and two (2) side surfaces 256-258 wherein the interface surface further includes a polished portion 203 and an anti-reflection ("AR") portion 207. Glass plate 208 is structured to be situated in parallel with collimators 210-218 for facilitating free space optical-paths. Polished portion 203 of the interface surface of prism 206 is used to couple to a first surface of glass plate 208. In one embodiment, optical filters 222-228 are aligned with AR portion 207 of interface surface of prism 206 with a predefined incident angle for facilitating wavelengths separation.

The optical filters such as filters 222-228, in one embodiment, are thin film filters ("TFF") used for selectively transmitting light based on different wavelengths. A function of the optical filter is to separate or extract one particular wavelength while redirecting the remaining wavelengths in another direction. In one aspect, multiple optical filters 222-228 are coupled to AR portion 207 of interface surface of prism 206 for accepting and/or redirecting optical beams traveling through the free-space inside of prism 206 as well as glass plate 208.

Input collimator 210 is able to receive an optical beam containing a set of different wavelengths λ1, 2, 3, 4 and guides λ1, 2, 3, 4 toward input prism or glass block 220 after λ1, 2, 3, 4 are collimated. Output collimators 212-218 receive or accept output wavelengths λ1, λ2, λ3, λ4 from optical filters 222-228, respectively, and direct λ1, λ2, λ3, λ4 to their output ports (not shown). In one aspect, collimators 210-228 are aligned on the same side of prism 206 on top of glass plate 208 which is capable of facilitating necessary optical paths for wavelengths separation.

Prism 206, in one aspect, includes at least one (1) interface surface and two (2) side surfaces 256-258 wherein two (2) side surfaces 256-258 are used to redirect or fold input optical beam(s) as well as output optical beam(s) for signal separation with minimal loss. The interface surface of prism 206 is further divided into at least an AR portion surface 207 and polished portion surface 203. While the AR portion surface is coated with AR coating, the polished portion surface is polished without AR coating. In one aspect, the AR portion surface is used to optically interface with the optical filters such as filters 222-228 and the polished portion surface is used to couple to glass plate 208.

Glass plate 208, in one embodiment, is a glass block which can be made of glass, crystal, clear polymer, compound, or the like, and is configured to provide free-space optical communication for providing optical paths for facilitating wavelengths separation. One end of glass plate 208 as indicated by numeral 209 is coated with high-reflective ("HR") coating serving a function of mirror capable of reflecting light back to prism 206 with minimal loss. Referring back to diagram 200, glass plate 208 is situated underneath of collimators 210-218 next to prism 206 for performing a function of optical folding in which the optical beams are traveling underneath or in parallel with collimators to conserve space or device footprint.

In one example, input prism 220, also known as a first prism or glass block, is an anti-reflection prism refracts light from input or first collimator 210 to prism 206 (or second prism) with an angle α which is similar or the same angle as to the filters. When light passes through prism 206 (second prism), the light, after folding at prism 206, enters glass plate 208. Surface 209 of glass plate 208 which is coated with the high-reflectivity coating reflects light again back to prism 206 (second prism). At least a portion of the light such as wavelength λ1 passes through filter such as filter 222 which is coupled into collimator 222. Multiple paths lead to separation of λ2 . . . λn.

In operation, an array of collimators 210-218 is assembled on glass plate 208 next to prism 206 which is used to fold the light underneath of collimators 210-218 via glass plate 208. Input collimator 210 is aligned in parallel to output collimators 212-218. A light beam with λ1 . . . λn is received by collimator 210 which guides the light beam to prism 206 through input prism 220. After reflecting the light beam with λ1 . . . λn by input prism 220, the light beam strikes at the right angle of prism 206 with an incident angle that is the same of glass plate cutting angle. The angle of input prism 220 can be determined by the glass plate cutting angle which can be obtained or calculated by Snell's law for optics. Output collimators 212-218 are aligned with optical filters 222-228 which can be thin film filters. Optical filters 222-228 are aligned to the interface surface as known as hypotenuse side of prism 206.

Prism 206 contains an anti-reflection front surface 207 and other two surfaces 256-258 are polished without any coating. Light with multiple wavelengths can be, for example, reflected and passes into glass plate 208. When light finally hits surface 209 of glass plate 208 the light bounces back and horizontally shifts a certain amount of degree in accordance with AOI. For example, one color light passes through input optical filter or thin film filter 222 and is collected by collimator 212. Light containing other colors is reflected back into prism 206. This process repeats though collimators 214-218 until all colors are separated.

For example, when input light beam contains $\lambda_{1,\,2,\,3,\,4}$ is received by input collimator 210, the light beam containing $\lambda_{1,\,2,\,3,\,4}$ enters prism 206 via input prism 220 with AOI. After traveling through prism 206 and glass plate 208, optical filter 222 is able to extract first wavelength $\lambda_1$ from the light and redirecting the remaining wavelengths $\lambda_{2,\,3,\,4}$ back into prism 206. After collimating first wavelength $\lambda_1$, collimator 212 outputs $\lambda_1$ to its output port (not shown). After traveling through prism 206 and glass plate 208, optical filter 224 extracts second wavelength $\lambda_2$ from the light and redirecting the remaining wavelengths $\lambda_{3,\,4}$ back into prism 206. After collimating second wavelength $\lambda_2$, collimator 214 outputs $\lambda_2$ to its output port (not shown).

After traveling through prism 206 and glass plate 208, optical filter 226 extracts third wavelength $\lambda_3$ from the light and redirecting the remaining wavelengths $\lambda_4$ back into prism 206. After collimating third wavelength $\lambda_3$, collimator 216 outputs $\lambda_3$ to its output port (not shown). After traveling through prism 206 and glass plate 208, optical filter 228 receives the last wavelength $\lambda_4$. After collimating fourth wavelength $\lambda_4$, collimator 218 outputs $\lambda_4$ to its output port (not shown).

It should be noted that one input collimator and four output collimator are merely an exemplary configuration. Additional input collimators and output collimators can be added or removed without alter the underlying concept of the exemplary embodiment(s) of the present invention.

An advantage of using FOM is that it is able to reduce overall physical structure or footprint of a WDM device by redirecting or folding optical beam(s) to travel in parallel with collimators.

Figure 2B:
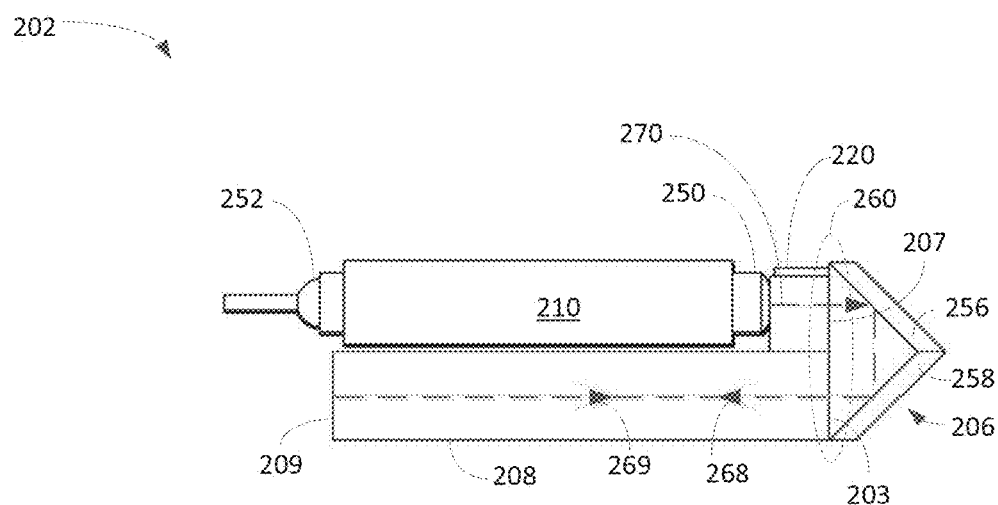

FIG. 2B is a side view diagram 202 illustrating a WDM device or WDM block configured to separate multiple optical signals using FOM in accordance with one embodiment of the present invention. Diagram 202 is a cut-open side view diagram of 200 shown in FIG. 2A according to dotted line A-A'. Diagram 202 illustrates an input collimator 210, input prism 220, prism 206, and glass plate 208. Input collimator 210 includes a fiber pigtail 252 and lens 250. It should be noted that the underlying concept of the exemplary embodiment(s) of the present invention would not change if one or more blocks (or devices) were added to or removed from diagram 202.

Prism 206 includes an interface surface (or hypotenuse side) 260 and two sides 256-258 wherein interface surface 260 is further divided into AR portion 207 and polished portion 203. A function of two sides 256-258 of prism 206 is to turn or fold a light in 180 degrees (°) which will allow the light to travel through free-space in glass plate 208 to fulfill optical-path requirement. For example, after collimation by collimator 210, light beam 270 passes through input prism 220 to generate AOI, and after making an 180° turn, light beam 270 becomes light beam 268 which leaves prism 206 and enters glass plate 208 via polished portion 203 of interface surface 260. Upon hitting HR side or wall 209 of glass plate 208, light beam 268 makes another 180° turn in which light beam 268 becomes light beam 269 traveling toward prism 206. Light beam 269 is subsequently processed.

An advantage of using FOM is that it can reduce physical size of WDM device because it allows the optical light to travel underneath or parallel to collimators.

Figure 3A:
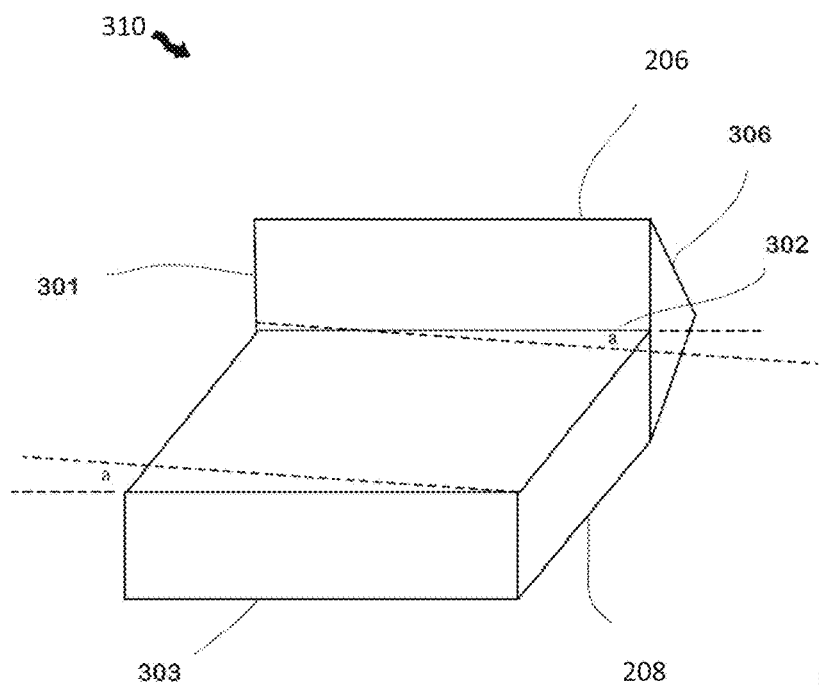
FIGS. 3A-B are block diagrams illustrating a glass plate 208 with a prism 206 used to facilitate FOM for signal separation in accordance with one embodiment of the present invention.

FIG. 3A is a 3D block diagram 310 illustrating a glass plate 208 with a prism 206 used to facilitate FOM for signal separation in accordance with one embodiment of the present invention. Diagram 310 illustrates one embodiment of a folding mirror structure which includes a prism 206 and a glass plate 208. Prism 206 which can be right angle prism is a folding mirror attached to glass plate 208 with a cut angle of a which equals to a designated AOI for filters. Prism 206 includes a half surface which is polished without coating attached to glass plate 208. Another half surface of prism 206 is exposed to air which is coated with AR coating used for coupling to optical filters and/or collimators (not shown). Glass plate 208, in one aspect, includes a front surface polished without AR coating that is used to attach to prism 206. One of back surface 303 is coated with HR coating whereby it acts as a mirror capable of reflecting light with minimal optical loss. In one example, prism 206 and glass plate 208 can be attached using epoxy or optical contact. It should be noted that the underlying concept of the exemplary embodiment(s) of the present invention would not change if one or more blocks (or devices) were added to or removed from diagram 310.

In one example, diagram 310 illustrates an exemplary configuration of prisms for a free space DWDM device. Glass plate 208 is a base member or transparent glass block. The back vertical side 303 has a high reflectivity coating. The horizontal surface the base member is cut with a specific angle 302. The shape of the base member or glass plate 208, in one aspect, is a parallelogram. This particular configuration with the angled glass plate 208 allows a free-space DWDM device to be structured in a small or compact size. As light enters the right angled prism 206, hypotenuse surface 301 which is an AR coated surface allows the light to pass through surface 301. Angled side 306 guides and/or reflects the light to enter glass plate 208 by turning or folding the light multiple times. As reaching HR surface 303, the light is reflected by the HR coated surface. The light can travel back to prism 206 and again out of the transparent surface 301. In one aspect, the optical-path length is folded to a free-space situated underneath to the collimators by using glass plate 208 and prism 206.

Figure 3B:
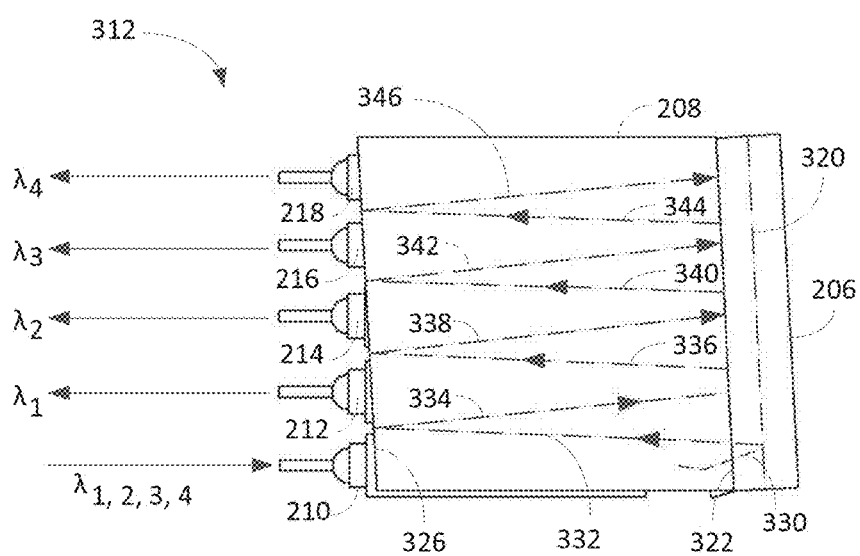

FIG. 3B is a diagram 312 illustrating a glass plate used to perform FOM for facilitating separating optical signals in accordance with one embodiment of the present invention. Diagram 312 illustrates a bottom view of diagram 200 shown in FIG. 2A viewing from the bottom looking upward with a light travel pattern of optical beam. Upon receipt of an input optical beam contains $\lambda_{1, 2, 3, 4}$ by input collimator 210, optical beam 330 containing $\lambda_{1, 2, 3, 4}$ enters prism 206 with AOI. After hitting two side surfaces 320 of prism 206, optical beam 330 becomes optical beam 332 traveling in the opposite direction of optical beam 330. Upon striking HR back side surface 326 of glass plate 208, optical beam 332 becomes optical beam 334 traveling in the opposite direction of optical beam 332 with AOI. After hitting two side surfaces 320 of prism 206, a first output optical filter extracts first wavelength $\lambda_1$ from optical beam 334 and redirects the remaining optical beam containing wavelengths $\lambda_{2, 3, 4}$ back into prism 206. After hitting two side surfaces 320 of prism 206, optical beam 334 becomes optical beam 336 traveling in the opposite direction of optical beam 334. Upon striking HR back side surface 326 of glass plate 208, optical beam 336 becomes optical beam 338 traveling in the opposite direction of optical beam 336 with AOI. After hitting two side surfaces 320 of prism 206, a second output optical filter extracts second wavelength $\lambda_2$ from optical beam 338 and redirects the remaining optical beam containing wavelengths $\lambda_{3, 4}$ back into prism 206. After hitting two side surfaces 320 of prism 206, optical beam 338 becomes optical beam 340 traveling in the opposite direction of optical beam 338. Upon striking HR back side 326 of glass plate 208, optical beam 340 becomes optical beam 342 traveling in the opposite direction of optical beam 340 with AOI. After hitting two side surfaces 320 of prism 206, a third output optical filter extracts second wavelength $\lambda_3$ from optical beam 342 and redirects the remaining optical beam containing wavelengths $\lambda_4$ back into prism 206. After hitting two side surfaces 320 of prism 206, optical beam 342 becomes optical beam 344 traveling in opposite direction as optical beam 342. Upon striking HR back side 326 of glass plate 208, optical beam 344 becomes optical beam 346 traveling in opposite direction of optical beam 344 with AOI. After hitting two side surfaces 320 of prism 206, a fourth output optical filter extracts fourth wavelength $\lambda_4$ from optical beam 346 and the separation process ends.

FIGS. 4-5 are block diagrams 400-402 illustrating exemplary collimators used with WDM device(s) for facilitating FOM in accordance with one embodiment of the present invention. Collimator 400 includes a lens 408, a fiber pigtail 410, a gap 418, and a tube 406. Gap 418, in one example, is a gap with an eight (8) degree angle for reducing optical or light return loss. Collimator 400 further includes a fiber 416 which is used to receive or transmit light between the port and lens 408. Tube 406 can either be made of glass or metal depending on the application. It should be noted that the underlying concept of the exemplary embodiment(s) of the present invention would not change if one or more components (or elements) were added to or removed from diagram 400.

Collimator 402, in one embodiment, includes a lens 428, a fiber pigtail 410, a gap 438, and a tube 426. Gap 438, in one example, is a gap with a larger space with eight (8) degree angle wall for reducing optical or light return loss. In one aspect, collimator 402 includes an adjustable opening 440 that allows a thin glass 442 to be inserted into gap 438 for adjusting the focal point. Tube 426 can either be made of glass or metal depending on the application.

Collimator 400 or 402 which is also known as mini-fiber collimator includes lens 408 or 428 and fiber pigtail 410 that can be glued into a glass/metal tube 406 or 426. The adjustment of gap such as gap 438 between fiber end 416 and lens 428 can change the beam collimation. It should be noted that light beams maintain collimation for a certain distance which is called working distance. If a pair of collimators (as emitting and receive light) separation within the working distance, the coupling loss is relatively small. Beyond the working distance, the coupling loss will increase substantially. Note that low or minimal optical loss is desirable. It should be noted that working distance can be adjusted in certain range, but it eventually limited by the lens (both the diameter and thickness). For all compact devices, small size is required. For example, a lens with diameter of 1 mm (millimeter) or less has the longest working distance about 60-80 mm.

Figure 6:
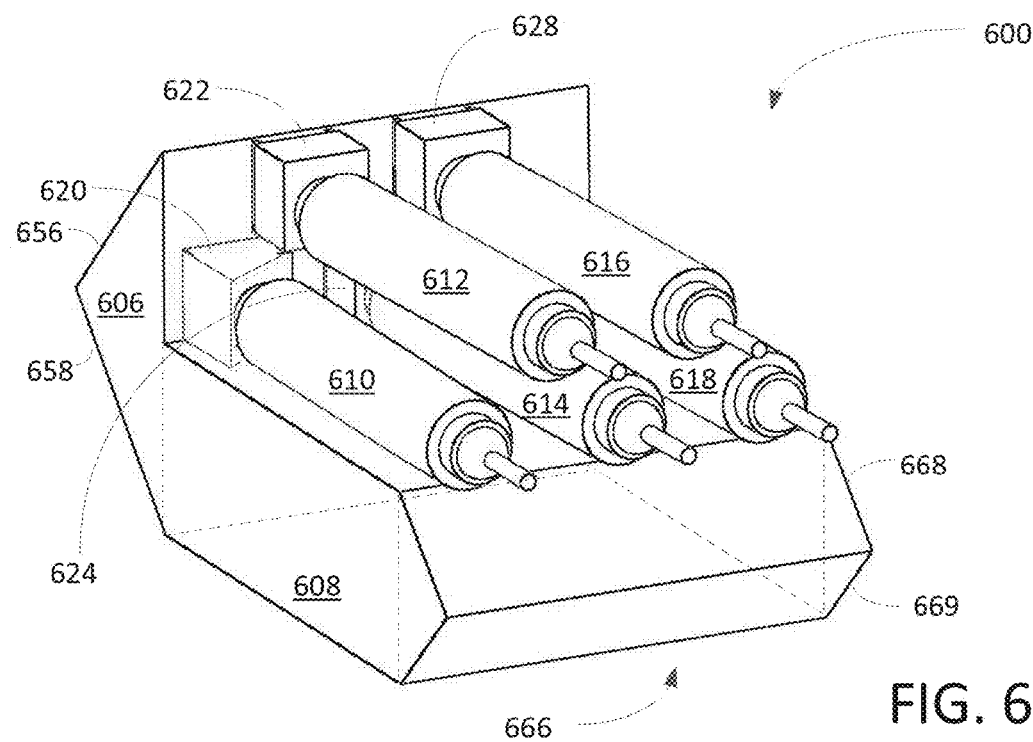
FIGS. 6-7 are diagrams illustrating an alternative configuration of WDM device capable of providing FOM with a stacked configuration in accordance with one embodiment of the present invention.

FIG. 6 is a 3D diagram 600 illustrating an alternative configuration of WDM device capable of providing FOM with a stacked configuration in accordance with one embodiment of the present invention. Diagram 600 is similarly to diagram 200 shown in FIG. 2A except that diagram 600 illustrates a double layered FOM configuration. For example, instead of placing all four output collimators 212-218 in the same layer as shown in FIG. 2A, WDM device shown in FIG. 6 places output collimators in double layers or stacked formation. For instance, output collimators 612 and 616 are placed or situated on top of output collimators 614 and 618. Depending on the applications such as prism dimensions, the height of top layer collimators can be adjusted accordingly.

Diagram 600 illustrates a WDM device such as demux containing an input collimator 610, input prism 620, four output collimators 612-618, four optical filters 622-628, prism 606, glass plate 608, and mirror prism 666. Optical filters 622-628 and collimators 610-618 are similar to optical filter 222-228 and collimators 210-218 as shown in FIG. 2A. To operate double layered collimators, a larger size prism 606 is used to catch, direct, and/or fold optical beams to and from the second layer of collimators. In one embodiment, mirror prism also known as a third prism 666 is employed to handle or fold optical beams.

It should be noted that instead of one prim such as prism 606 attached with a glass plate 608 with HR surface, a third prism or mirror prism 666 is used to attach glass plate 608. Collimators are aligned in two layers to save more space. In one example, prism attachment can be achieved via glass bar and/or optical glue. It should be noted that the underlying concept of the exemplary embodiment(s) of the present invention would not change if one or more blocks (or devices) were added to or removed from diagram 600.

One embodiment of the present invention discloses an optical WDM device with a stacked configuration. The WDM device includes input collimator 610, prism 606, glass plate 608, input prism 620, and output collimator 612. Input collimator 610 is able to receive an optical beam containing a set of wavelengths $\lambda_n$ and facilitates the optical beam to travel through free-space. Prism 606 includes an interface surface and two side surfaces 656-658 optically coupled to input collimator 610. The interface surface of prism 606 includes two portions wherein the first portion is used to interface with collimators while the second portion is used to interface with glass plate 608. Two side surfaces 656-658 of prism 606 are used to direct and/or redirect light. Glass plate 608 which is coupled to the second portion of interface surface of prism 606 facilitates free-space optical communication which allows the light to travel through at least a portion of glass plate 608 for facilitating signal separation.

While input prism 620 is situated between input collimator 610 and interface surface of prism 606, the interface surface of prism 606 facilitates the entry point for the optical beam to enter from input prism 620 to prism 606. First output collimator 612 having a lens end and a fiber end is configured to receive a first output signal from prism 606 in accordance with the input optical beam. First optical filter 622 which is situated between first output collimator 612 and prism 606 has an optical receiving surface which is situated at a predefined angle with respect to the interface surface of prism 606 for facilitating frequency separation. First optical filter 622 is able to extract a first wavelength ("$\lambda_1$") from a set of wavelengths to form a first output light signal with $\lambda_1$ and form a second optical beam with the remaining wavelengths of the optical beam.

The WDM device further includes a second output collimator 614 having a lens end and a fiber end and second optical filter 624. Second output collimator 614 is able to receive a second output signal from prism 606 in accordance with the optical beam. Second optical filter 624 which is placed between second output collimator 614 and prism 606 is configured to separate the second output signal from the optical beam. It should be noted that the optical filter(s) is a thin film filter capable of directing one wavelength in a first direction and directing the remaining wavelengths in a second direction.

In one embodiment, one side of glass place 608 situated adjacent to the interface surface of prism 606 contains an angle which facilitates a function of AOI for the optical beam. Glass plate 608 is further configured to reflect optical signals with a predefined reflective angle. It should be noted that input collimator 610 includes a fiber pigtail and a collimator lens wherein the fiber pigtail and the collimator lens are enclosed by a glass tube configured to transmit optical signals.

Figure 7:
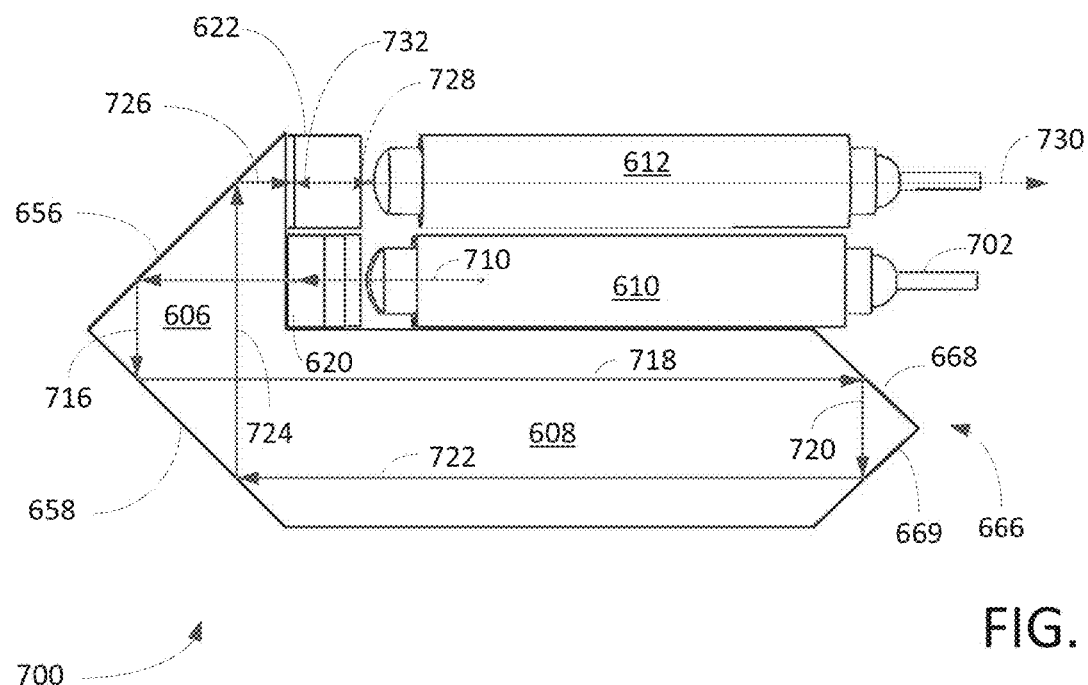

FIG. 7 is a side view diagram 700 illustrating an alternative configuration of WDM device capable of providing FOM with a stacked configuration in accordance with one embodiment of the present invention. Diagram 700 illustrates a side view of diagram 600 shown in FIG. 6. Diagram 700 includes an input collimator 610, output collimator 612, prism 606, input prism 620, optical filter 622, glass plate 608, and mirror prism 666. Mirror prism 666 contains two side surfaces 668-669 wherein side surfaces 668-669 are used to direct or redirect optical beams within glass plate 608. In one aspect, mirror prism 666 facilitates optical beams that can travel in multiple heights within glass plate 608. It should be noted that the underlying concept of the exemplary embodiment(s) of the present invention would not change if one or more blocks (or devices) were added to or removed from diagram 700.

During an operation, an input optical beam 710 which is collimated by collimator 610 travels to prism 606 via input prism or glass block 620 with an angle. Upon hitting first side surface 656 of prism 606, optical beam 710 becomes optical beam 716 which travels 90° from optical beam 710 towards second side surface 658. After striking second side surface 658, optical beam 716 becomes optical beam 718 which travels in the opposite direction of optical beam 710. Upon hitting first side surface 668 of prism 666, optical beam 718 becomes optical beam 720 which travels 90° from optical beam 718 towards second side surface 669. After striking second side surface 669, optical beam 720 becomes optical beam 722 which travels in the opposite direction of optical beam 718. Upon hitting side surface 658 of prism 606, optical beam 722 becomes optical beam 724 which travels 90° from optical beam 722 towards second side surface 656. After striking second side surface 656, optical beam 724 becomes optical beam 726 which travels in the opposite direction of optical beam 722. Upon arrival at optical filter 622, first wavelength λ1 728 is extracted and passed onto output collimator 612. The remaining optical beam containing remaining wavelengths 732 are redirected back into prism 606. Collimator 612 outputs first λ1 signal as output signal 730 to its predefined output port.

It should be noted that two layers of collimators are stacked one above another for a compact assembly configuration. Glass plate prism or mirror prism 666 is used to bend the light a third time and thus creates a shorter physical length. Collimators and thin film filters can be arranged closer together with the addition of the third glass plate base prism to fit in a compact device.

Figure 8:
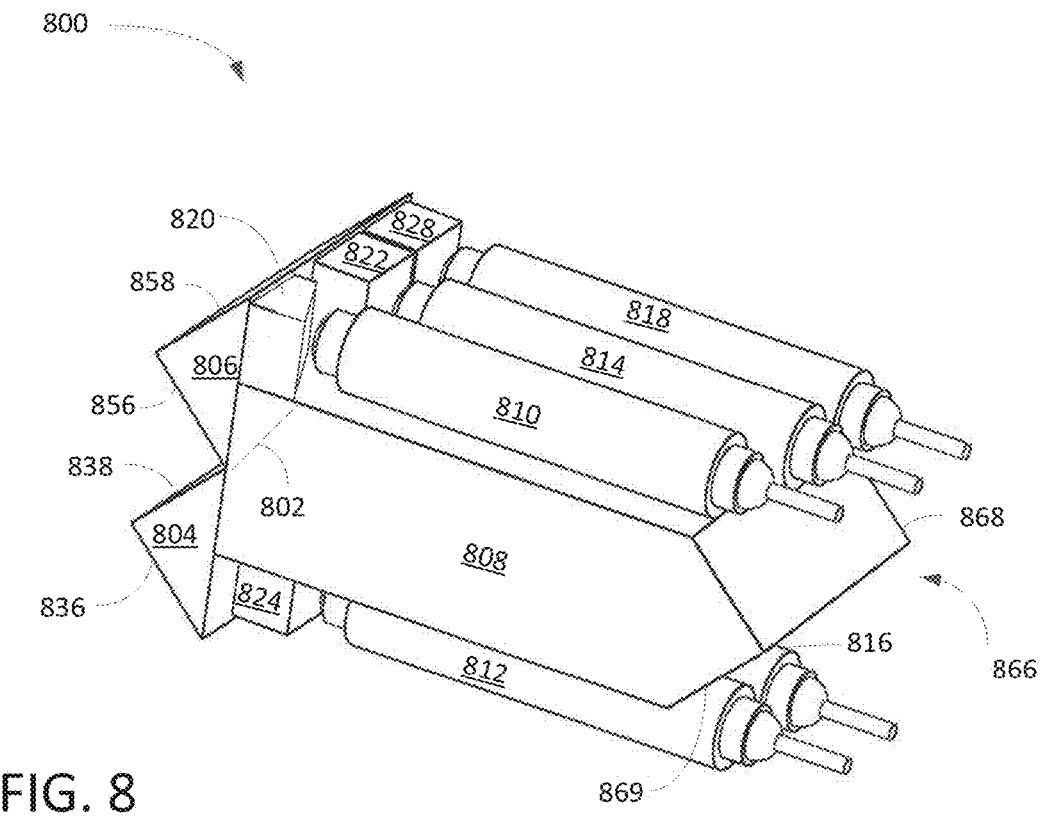
FIGS. 8-9 are diagrams illustrating an alternative embodiment of WDM device capable of performing FOM in accordance with one embodiment of the present invention.

FIG. 8 is a 3D diagram illustrating an alternative embodiment of WDM device capable of performing FOM in accordance with one embodiment of the present invention. Diagram 800 is similarly to diagram 600 shown in FIG. 6 except that diagram 800 illustrates a double layered FOM configuration wherein glass plate 808 is placed between input and output collimators 810-818. Diagram 800 illustrates a WDM device such as demux containing an input collimator 810, input prism 820, four output collimators 812-818, four optical filters 822-828, prisms 804-806, glass plate 808, and mirror prism 866. Optical filters 822-828 and collimators 810-818 are similar to optical filter 622-628 and collimators 610-618 as shown in FIG. 6. To place collimators between glass plate 808, two prisms 804-806 or a twin-peak prism containing two triangles 804-806 is used to catch and/or direct optical beams to and from collimators 810-818. In one embodiment, mirror prism also known as a third prism 866 is employed to handle the optical beams. In one aspect, three prisms 804-806 and 866 are aligned in such a way that it forms a double layer structure with collimators aligned both sides of prism 866.

An advantage of placing collimators on both sides of glass plate 808 is to reduce manufacture complication.

Figure 9:
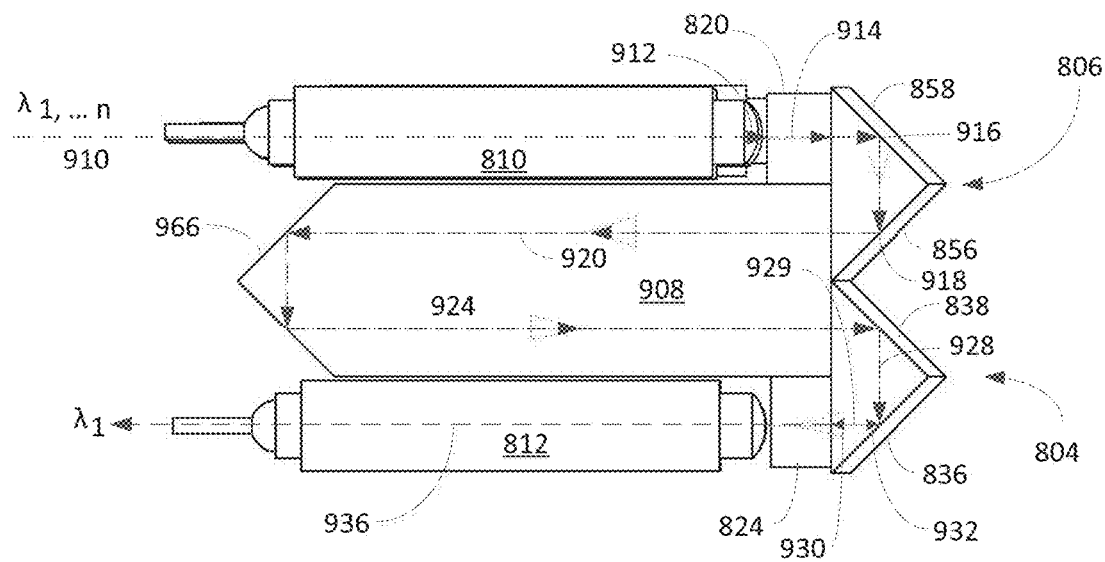

FIG. 9 is a block diagram 900 illustrating an alternative embodiment of WDM device capable of performing FOM in accordance with one embodiment of the present invention. Diagram 900 illustrates a side view of diagram 800 shown in FIG. 8. Diagram 900 includes an input collimator 810, output collimator 812, prisms 804-806, input prism 820, optical filter 824, glass plate 908, and mirror prism 966. Mirror prism 966 contains two side surfaces which are used to direct or redirect optical beams within glass plate 908. In one aspect, mirror prism 966 facilitates optical beams to travel multiple levels or heights within glass plate 908. It should be noted that the underlying concept of the exemplary embodiment(s) of the present invention would not change if one or more blocks (or devices) were added to or removed from diagram 900.

During an operation, an input optical beam containing $\lambda_1 \ldots _n$ 910 is arrived at input collimator 810. After collimating, optical beam 910 becomes optical beam 912 which enters input prism or glass block 820 with an angle. At input prism 820, optical beam 912 becomes optical beam 914 which exits input prism 820 and enters prism 806. Upon hitting first side surface 858 of prism 806, optical beam 914 becomes optical beam 916 which travels in 90° from optical beam 914 towards second side surface 856. After striking second side surface 856, optical beam 916 becomes optical beam 918 which travels in the opposite direction of optical beam 910. After exiting prism 806 and entering glass plate 908, optical beam 918 becomes optical beam 920. Upon hitting two side surfaces of prism 966, optical beam 920 becomes optical beam 924 which travels in the opposite direction of optical beam 920. Upon hitting side surface 838 of prism 804, optical beam 924 becomes optical beam 928 which travels at 90° from optical beam 924 towards second side surface 836. After striking second side surface 836, optical beam 928 becomes optical beam 929 which travels in the opposite direction of optical beam 924. Upon arrival at optical filter 824, first wavelength λ1 930 is extracted and passed onto output collimator 812. The remaining optical beam containing remaining wavelengths 932 are redirected back into prism 804. Collimator 812 outputs first λ1 signal as output signal 936 to its predefined output port.

Figure 10:
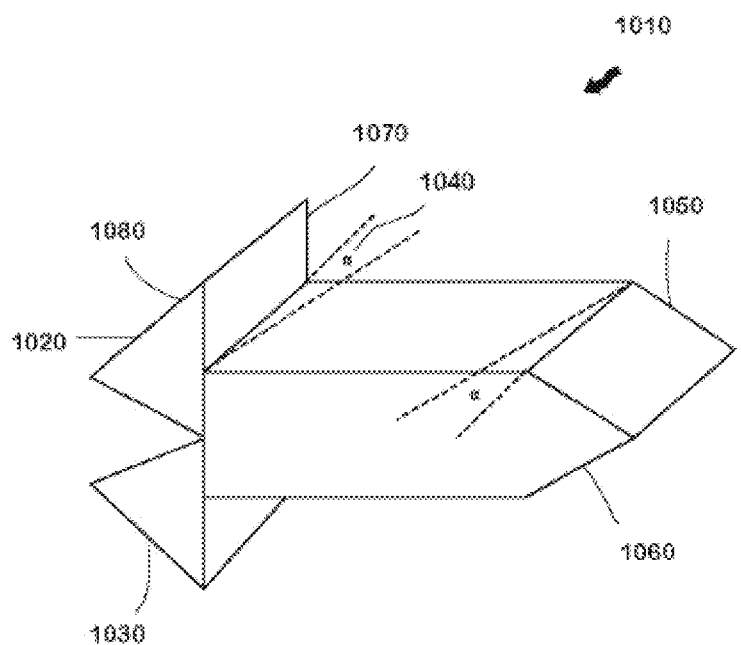
FIG. 10 is a diagram illustrating a glass plate capable of providing communication to collimators in a double layer formation in performing FOM in accordance with one embodiment of the present invention.

FIG. 10 is a diagram 1010 illustrating a glass plate capable of providing communication to collimators in a double layer formation in performing FOM in accordance with one embodiment of the present invention. Diagram 1010 shows an alternative layout similarly illustrated in FIGS. 8-9. Diagram 1010 includes a base member or glass plate 1060, prisms 1030 and 1080. Glass plate or base member 1060 can be a transparent glass plate. The back vertical side 1050 has no reflectivity coating. It is shaped as a right angle prism. The horizontal surface of base member 1060 is cut with a specific angle 1040. The shape of base member 1060 can be a parallelogram. With employing base member 1060, the physical dimension of a free-space DWDM device can be reduced.

As light enters the right angle prism 1020, its hypotenuse side has an anti-reflection coating surface 1070 that allows light to pass through surface 1070 and reflect down from angled side 1080. When the light reflects down from right angled prism 1020, base member 1060's back vertical surface 1050 allows for light to be bounced back to hit the lower prism 1030. As light enters lower prism 1030, the optical components such as the collimators can be configured below base member 1060 to collect the light. The path length is shortened by using the embodiment of glass base member 1060.

Figure 11:
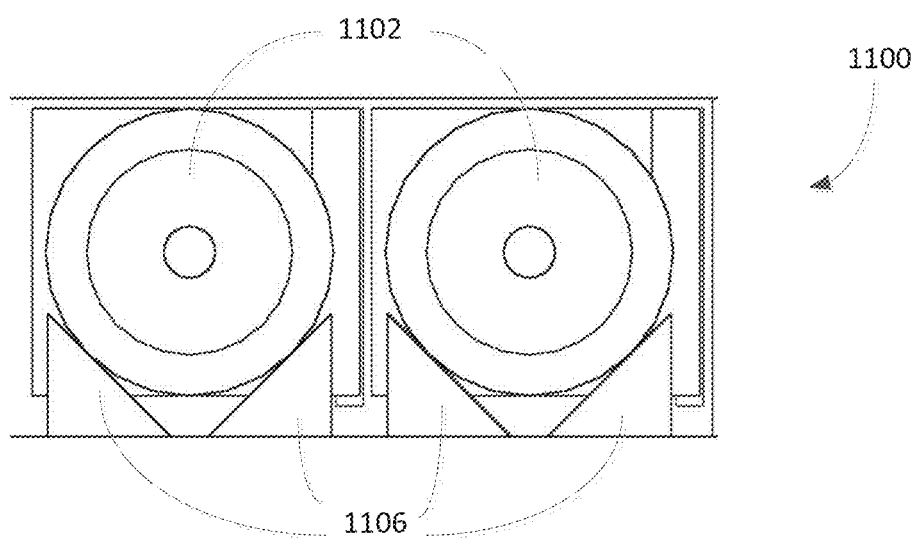
FIGS. 11-13 are diagrams illustrating mechanism(s) of anchoring collimators and glass plate in parallel in accordance with one embodiment of the present invention.

FIG. 11 is a block diagram 1100 illustrating a mechanism of anchoring collimators and glass plate in parallel in accordance with one embodiment of the present invention. Diagram 1100 includes two collimators four triangular-shaped blocks or mounting block 1106. Diagram 1100 illustrates a front view of two collimators 1102 aligned side by side horizontally. The assembly method for collimators 1101 includes a wedge-mounting configuration. In one aspect, triangular-shaped glasses 1106 are used to attach the input and out collimators 1102 inside a DWDM device. Since the surface of collimator 1102 is curved, it is best to position a flat side of a triangular shaped mounting block to a horizontal surface of the glass surface. Note that the angled side of triangular-shaped glass 1106 will allow a secure wedge mounting position for the round collimators 1102. When two triangular-shaped blocks 1106 are cured to a glass surface with angled sides facing each other, collimator 1102 can wedge in between two blocks 1106 for a secure attachment.

Figure 12:
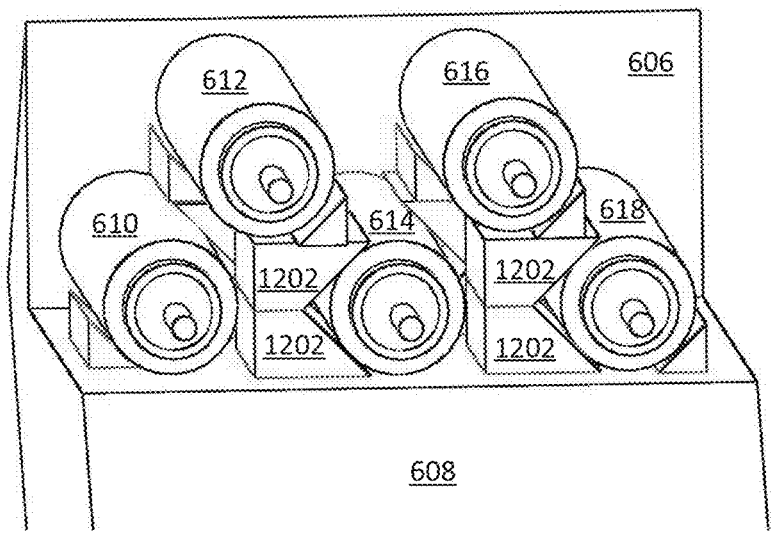
Figure 13:
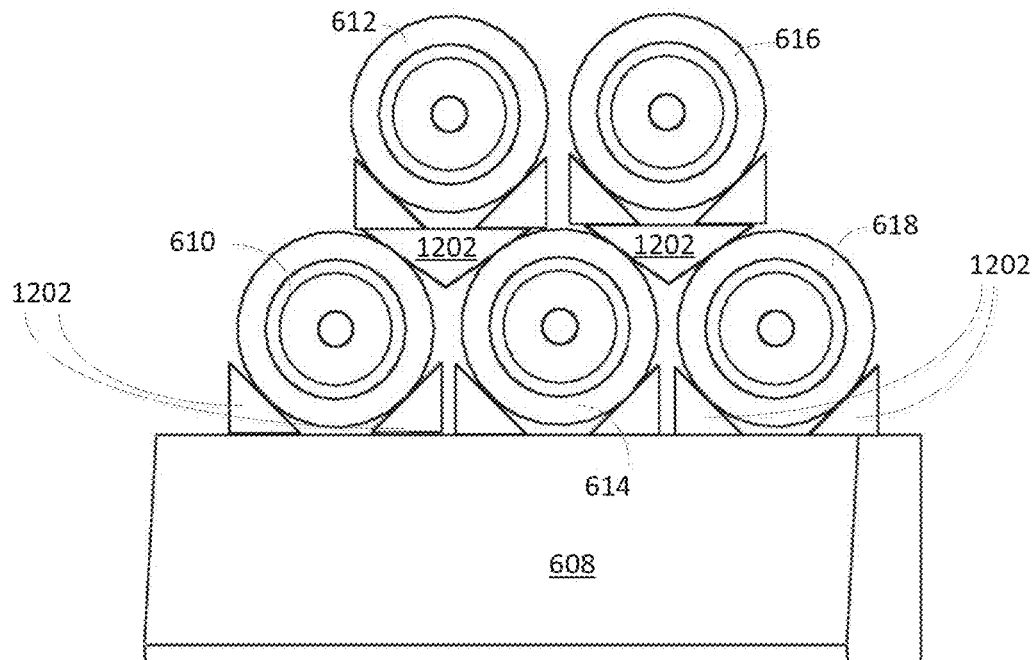

FIG. 12 is a 3D diagram 1200 illustrating mechanism(s) of anchoring collimators in double layers and glass plate in parallel in accordance with one embodiment of the present invention. FIG. 13 is a diagram 1300 illustrating a mounting scheme when the separation of collimators is close enough that does not allow the mounting mechanism as described in diagram 1200. Diagrams 1200 and 1300 are similar to diagram 600 shown in FIG. 6 except that diagrams 1200 and 1300 show triangle glass blocks 1202 which are used to anchor or attach collimators to glass plate 608. Diagram 1200 or 1300 includes input and output collimators 610-618, glass plate 608, prism 606, and triangle glass blocks 1202. For one side double layers with loose alignment, triangle glass block 1202, for example, can hold a collimator such as collimator 610 from both sides but shifted with each other to have enough space. Note that the second layer can be mounted by a triangle block 1202 from bottom. For a tightly aligned structure, the first layer could be attached from bottom by using small glass triangle block such as block 1202. It should be noted that glass triangle blocks 1202 can be used to bridge both collimators and then attach the second layer collimators by the same way as the first layer.

The exemplary embodiment of the present invention includes various processing steps, which will be described below. The steps of the exemplary embodiment of the present invention may be embodied in machine or computer executable instructions. The instructions can be used to cause a general purpose or special purpose system, which is programmed with the instructions, to perform the steps of an exemplary embodiment of the present invention. While embodiments of the present invention will be described with reference to the DWDM network, the method and apparatus described herein is equally applicable to other network infrastructures or other data communications environments.

Figure 14:
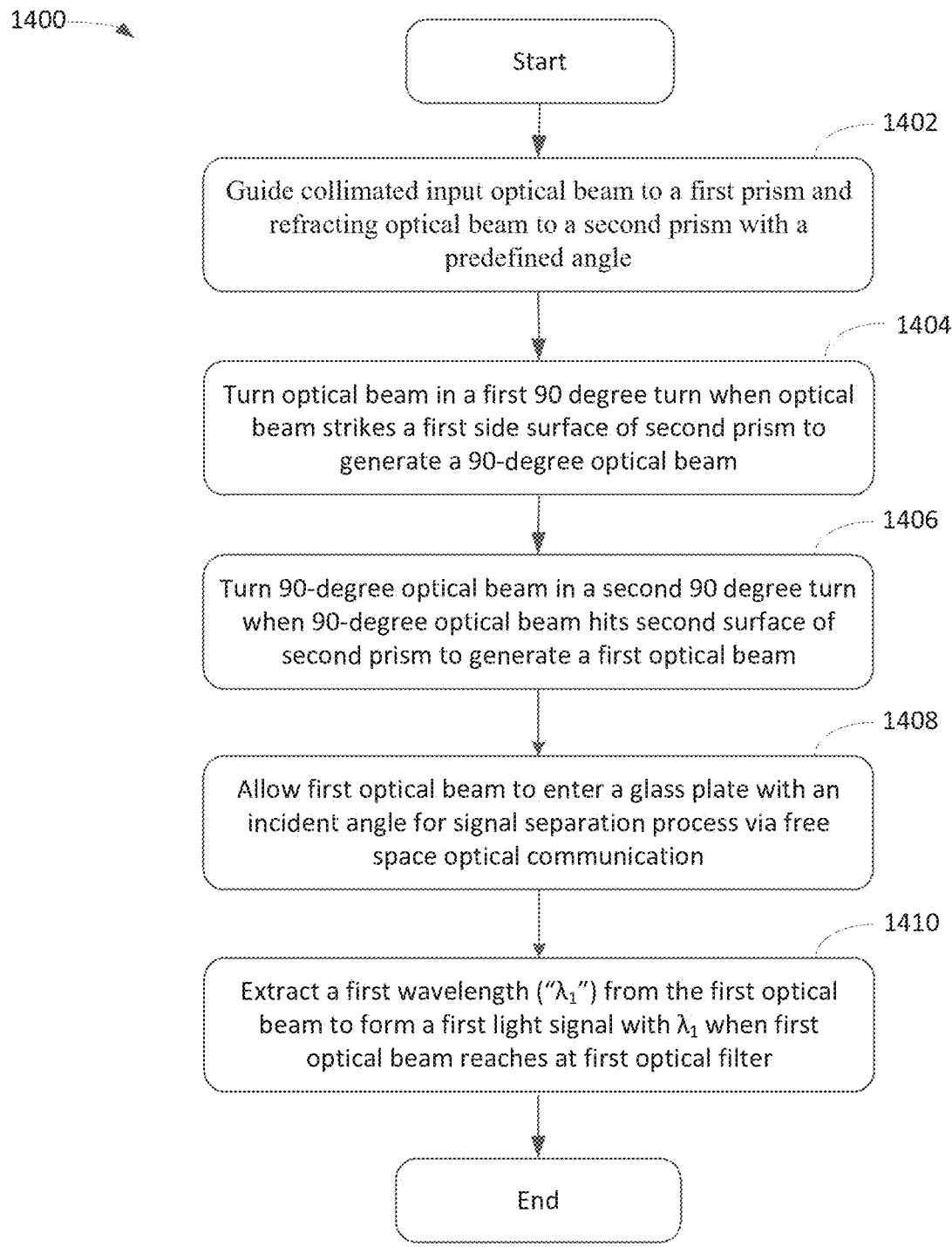
FIG. 14 is a flowchart illustrating an exemplary process of FOM in accordance with one embodiment of the present invention.

FIG. 14 is a flowchart 1400 illustrating an exemplary process of FOM in accordance with one embodiment of the present invention. At block 1402, a process of demultiplexing an optical light beam for a WDM device is able to guide collimated input optical beam to a first prism and refracting the optical beam toward a second prism with a predefined angle.

At block 1404, the optical beam is turned in a first ninety (90) degree turn when the optical beam strikes a first side surface of the second prism. After generating a 90-degree optical beam, it travels toward a second surface of the second prism.

At block 1406, the 90-degree optical beam is made a second ninety (90) degree turn when the 90-degree optical beam hits the second surface of the second prism. The 90-degree optical beam becomes a first optical beam which travels in a direction approximately opposite direction to travel direction of the optical beam.

At block 1408, the first optical beam is allowed to enter a glass plate with an incident angle for facilitating signal a separation process via a free space optical communication.

At block 1410, the process extracts a first wavelength ("$\lambda_1$") from the first optical beam to form a first light signal with $\lambda_1$ when the first optical beam reaches to the first optical filter, and subsequently forming a second optical beam with the remaining wavelengths of the first optical beam. In one embodiment, the second optical beam is redirected from the first optical filter to the second prism passing through an interface surface of the second prism. The first light signal is allowed to pass through the first optical filter reaching to a first collimator and forwarding the first light signal by the first collimator to a first port of the WDM device. The second optical beam is redirected from the second prism towards the glass plate permitting the second optical beam to pass through free-space facilitated by the glass plate. A second wavelength ("$\lambda 2$") is extracted from the second optical beam when the second optical beam reaches to the second optical filter, and forming a third optical beam with remaining wavelengths of the second optical beam.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. An optical wavelength-division multiplexing ("WDM") device, comprising:
   an input collimator configured to receive an optical beam containing a plurality of wavelengths ("$\lambda_n$") and facilitate the optical beam to travel through free-space;
   a plurality of output collimators arranged in parallel to the input collimator;
   an input prism placed at output of the input collimator and configured to have an angled surface for facilitating receiving and redirecting the optical beam;
   a plurality of filters situated at inputs of the plurality of output collimators for facilitating demultiplexing the optical beam;
   a prism having an interface surface and two side surfaces optically coupled to the input collimator, a first portion of the interface surface of the prism configured to interface with the plurality of output collimators, the two side surfaces of the prism configured to redirect light; and
   a glass plate, having a reflective surface, coupled to a second portion of the interface surface of the prism and configured to facilitate free-space optical communication allowing light after redirected by the angled surface, traveling through at least a portion of the glass plate including the reflective surface for facilitating signal separation from the optical beam.

2. The optical WDM device of claim 1, wherein the input prism an angled surface, is situated between the input collimator and the interface surface of the prism for facilitating entry point of the interface of the prism for the optical beam to enter from the input prism to the prism.

3. The optical WDM device of claim 1, wherein a first output collimator of the plurality of output collimators has a lens end and a fiber end, and configured to receive a first output signal from the prism in accordance with the optical beam.

4. The optical WDM device of claim 3, wherein a first optical filter of the plurality of filters, situated between the first output collimator and the prism, having an optical receiving surface which is situated at a predefined angle with respect to the interface surface of the prism for facilitating frequency separation.

5. The optical WDM device of claim 4, wherein the first optical filter is configured to extract a first wavelength ("$\lambda_1$") from the plurality of wavelengths to form a first output light signal with $\lambda_1$ and form a second optical beam with remaining wavelengths of the optical beam.

6. The optical WDM device of claim 3,
wherein a second output collimator of the plurality of output collimators having a lens end and a fiber end, and configured to receive a second output signal from the prism in accordance with the optical beam; and
wherein a second optical filter of the plurality of filters placed between the second output collimator and the prism, and configured to separate the second output signal from the optical beam.

7. The optical WDM device of claim 4, wherein the first optical filter is a thin film filter capable of directing one wavelength in a first direction and remaining wavelengths in a second direction.

8. The optical WDM device of claim 1, wherein one side of the glass plate situated adjacent to the interface surface of the prism contains an angle which facilitates a function of angle of incidence for the optical beam.

9. The optical WDM device of claim 1, wherein the glass plate is configured to reflect optical signals with a predefined reflective angle.

10. The optical WDM device of claim 1, wherein the input collimator includes a fiber pigtail and a collimator lens wherein the fiber pigtail and the collimator lens are enclosed by a glass tube configured to transmit optical signals.

11. A multiport free-space WDM system capable of facilitating optical communication comprising the optical WDM device of claim 1.

12. A method of demultiplexing an optical light beam for a wavelength-division multiplexing ("WDM") device, comprising:
guiding collimated input optical beam from an input collimator to an angled surface of a first prism and refracting the optical beam from the first prism toward a second prism with a predefined angle;
turning the optical beam in a first ninety (90) degree turn when the optical beam strikes a first side surface of the second prism to generate a 90-degree optical beam traveling toward a second surface of the second prism;
turning the 90-degree optical beam in a second ninety (90) degree turn when the 90-degree optical beam hits the second surface of the second prism to generate a first optical beam which travels approximately in an opposite direction of light traveling direction of the optical beam;
allowing the first optical beam to enter a glass plate with an incident angle generated by the angled surface for facilitating a signal separation process via a free space optical communication through the glass plate; and
guiding the first optical beam via a reflective surface of the glass plate toward a first output collimator of a plurality of output collimators.

13. The method of claim 12, further comprising extracting a first wavelength ("$\lambda_1$") from the first optical beam to form a first light signal with $\lambda_1$ when the first optical beam reaches to the first optical filter, and forming a second optical beam with remaining wavelengths of the first optical beam.

14. The method of claim 13, further comprising redirecting the second optical beam from the first optical filter to the second prism passing through an interface surface of the second prism.

15. The method of claim 13, further comprising allowing the first light signal to pass through the first optical filter reaching to a first collimator and forwarding the first light signal by the first collimator to a first port of the WDM device.

16. The method of claim 14, further comprising redirecting the second optical beam from the second prism towards the glass plate permitting the second optical beam to pass through free-space facilitated by the glass plate.

17. The method of claim 14, further comprising extracting a second wavelength ("$\lambda 2$") from the second optical beam when the second optical beam reaches to the second optical filter, and forming a third optical beam with remaining wavelengths of the second optical beam.

18. An optical wavelength-division multiplexing ("WDM") device utilizing folded optical-path, comprising:
a plurality of collimators including one input collimator and multiple output collimators capable of collimating optical lights for facilitating free-space optical communication;
an input prism having an angled surface coupled to the input collimator for guiding an optical beam;
a plurality of optical filters optically coupled with the plurality of output collimators and configured to filtering optical wavelengths in accordance with configurations of the plurality of optical filters;
a prism optically coupled with the plurality of optical filters and configured to have an interface surface and two side surfaces for redirecting optical light; and
a glass plate, having a reflective surface, optically coupled to the prism and physically configured to be situated in parallel with the plurality of collimators for facilitating free space optical paths for facilitating a process of signal separation from the optical light in response to redirected optical light via the angled surface and the reflective surface.

19. The device of claim 18, wherein a portion of the interface surface is coated with anti-reflection and another portion of the interface surface is polished, wherein polished portion of the interface surface is coupled to a first surface of the glass plate.

20. The device of claim 18, wherein the plurality of optical filters is aligned with anti-reflection portion of the interface surface with a predefined incident angle for facilitating wavelengths separation.

21. The device of claim 18, wherein the plurality of collimators includes one input collimator and four output collimators.

* * * * *